United States Patent

Nakamura

[11] Patent Number: 6,137,554
[45] Date of Patent: Oct. 24, 2000

[54] LIQUID CRYSTAL DISPLAY DEVICE

[75] Inventor: Hajime Nakamura, Yokohama, Japan

[73] Assignee: International Business Machines Corporation, Armonk, N.Y.

[21] Appl. No.: 08/922,251

[22] Filed: Sep. 2, 1997

[30] Foreign Application Priority Data

Sep. 27, 1996 [JP] Japan .................................. 8-255961

[51] Int. Cl.$^7$ ........................ G02F 1/1347; G02F 1/1335
[52] U.S. Cl. ............................ 349/75; 349/120; 349/117
[58] Field of Search ............................... 349/75, 76, 118, 349/188, 120, 177

[56] References Cited

U.S. PATENT DOCUMENTS 5,410,422 4/1995 Bos ............................................. 349/99
5,677,747 10/1997 Ishikawa et al. ......................... 349/76
5,774,197 6/1998 Nakamura ................................ 349/188
5,805,253 9/1998 Mori et al. ................................ 349/118

Primary Examiner—Hung Xuan Dang
Assistant Examiner—Dung Nguyen
Attorney, Agent, or Firm—J. P. Sbrollini

[57] ABSTRACT

A liquid crystal display device is provided which improves the angle of view characteristics over that of a conventional OCB type LCD, has a high transmissivity, and can be driven at a low voltage. The liquid crystal display device includes two optical phase difference compensating mechanisms interposed between two substrates and two filter mechanisms, each of which compensating mechanisms has an action for performing compensating modulation on light passing through about one half the thickness of said liquid crystal layer, wherein the product of anisotropy $\Delta n$ of the liquid crystal layer and its thickness d is preferably $0.8 < \Delta nd < 2.0$.

13 Claims, 4 Drawing Sheets

LIQUID CRYSTAL DISPLAY DEVICE

FIELD OF THE INVENTION

The present invention relates to a TFT liquid crystal display device with high speed response and wide angle of view characteristics. It relates to a liquid crystal display method in OCB mode of liquid crystal display devices.

BACKGROUND ART

Recently, liquid crystal display devices are being more widely used in thin, high resolution display devices. A typical schematic view of such liquid crystal device is shown in FIG. 1. The liquid crystal display device comprises a backlight 1, a liquid crystal cell 400, and polarizing plates 402a and 402b. The liquid crystal cell is disposed on the light emitting surface of the backlight. Light emitted from the backlight 1 toward the liquid crystal cell 400 (arrows) is transmitted through a polarizing plate 402a, and a glass substrate 403 on which a TFT 405 and a wiring layer 404 are formed, and enters into a liquid crystal layer 410 in which liquid crystal 409 is enclosed. The orientation of the liquid crystal layer is controlled by the TFT 405 and the wiring layer 404 both formed on the glass substrate 403. That is, the TFT 405 and the wiring layer 404 are connected to a driver (not shown), which supplies a predetermined voltage to each pixel through the wiring layer 404 and the TFT 405. Depending on this applied voltage, the liquid crystal molecule is oriented to a predetermined extent. The light transmitted through each pixel is modulated by this orientation. The modulated light is transmitted through an upper glass substrate 406, and is shielded or transmitted by the polarizing plate 402b. This determines transmissivity for each pixel, so that graphics and/or characters can be displayed in a meaningful pattern. The upper glass substrate 406 is formed with a black matrix layer and a color filter layer (not shown).

Such a liquid crystal display device has problems with its angle of view, its response, and the magnitude of its driving voltage. That is, one of problems of the liquid crystal display device is that variation or reversal of the transmissivity occurs with changes in the angle of view. (The angle of line of sight from the normal of screen.) If variation or reversal of the transmissivity occurs depending on the angle of view, an area which should appear blue can appear as if it is red, so that an original image is not reproduced accurately. The angle of view for a conventional twisted nematic (TN) type liquid crystal display is as narrow as about ±40° in the horizontal direction and about ±15–30° in the vertical direction.

In addition, when a driver of the liquid crystal display device drives the TFT, if the driving voltage is too high, it imposes a load on the driver and requires the use of an expensive driver. This significantly affects the life and cost of a liquid crystal display device. A conventional liquid crystal device typically uses a driving voltage of 5 V or less.

An approach for improving the angle of view in a TN type liquid crystal is an arrangement in which, as shown in FIG. 2, an optical phase difference compensating film 420 is placed between the glass substrates 403 and 406, and the polarizing plate 402a and 402b. For example, Japanese Published Unexamined Patent Application (PUPA) No. 2-91612 discloses a TN type liquid crystal display device in which compensating means is placed between a polarizing means and a glass substrate. Similarly, PUPA 6-75116 discloses a similar arrangement in which the optical axis with the minimum refractive index of optical phase difference compensating means is along a direction parallel to the plane, and the direction of one of other optical axes is inclined with respect to the normal of the plane. PUPA No. 5-313159 discloses a similar arrangement in which only one of refractive indices on the x, y and z axes of optical phase difference compensating means is high, while the other two are identical. All of these inventions relate to a TN type liquid crystal display device which differs from the display device of the present invention.

Using a compensating film cannot completely compensate the modulation occurring in the TN type liquid crystal layer. This is because the liquid crystal molecules themselves are twisted in the TN type liquid crystal layer, and the compensating film cannot compensate the optical effect on the twisting in view of its structure. In addition, a significant problem is imposed by reversal of gradation in the TN type liquid crystal layer.

An approach to improve the angle of view is to use a liquid crystal cell with bend orientation. The using of the liquid crystal cell with bend orientation is called OCB (Optically Compensated Birefringence). The bend orientation (also called a π cell) has an orientation which can be optically self-compensated, and is defined, in various publications, it has an orientation plane symmetrical with respect to a center plane 83 between substrates 81 and 82. As shown in FIG. 3, that twist does not substantially exist in a plane parallel to the glass substrates 81 and 82. It has arc continuity in which the angle θ between the major axis of the liquid crystal and the glass substrate is substantially 0° (or, 90°) near the lower glass substrate, gradually increasing (decreasing) toward the center line, to about 90° (0°), then gradually decreasing (increasing) toward the upper glass substrate, and there is substantially 0° (90°). The bend orientation has advantages that it has good response, and can be easily compensated for optical phase difference, so that the angle of view can be increased.

Conventionally, a negative birefringence film as in PUPA 6-294962 (U.S. Pat. No. 5,410,422), or an optically biaxial film described in "Improvement of Gray-Scale Performance of Optically Compensated Birefringence (OCB) Display Mode for AMLCDs," C. L. Kuo, et. al., Tohoku University, DIS '94 Digest have been used for the optical phase difference compensation for a bend oriented liquid crystal layer. Both of them can provide perfect optical phase difference compensation in the horizontal angle of view, but cannot provide a sufficient angle of view in the vertical or oblique direction because it cannot compensate the optical activity of the liquid crystal layer.

As described in "Optical Design of an OCB Display Device," Hajime Nakamura, Japanese Telecommunication Society Technical Bulletin, EID-95-115 (2/20/96), or "An Optimization of OCB Optics," H. Nakamura, IBM Japan Ltd., SID '96 Digest, there is an approach to significantly improve the vertical angle of view characteristics. This involved reducing Δnd (retardation), which is a product of index anisotropy (Δn) of the liquid crystal layer and its thickness (d), to decrease the optical activity of the liquid crystal layer. However, since Δnd of the liquid crystal layer is small. This approach is not always suitable for a portable notebook personal computer which requires a high transmissivity.

In addition, since the conventionally contemplated OCB type liquid crystal display device uses a high driving voltage as 6–10 V, design of a driving system is difficult while the driving voltage of normal twisted nematic liquid crystal is 5 V or less.

Problems to be Solved by the Invention

Therefore a first object of the present invention is to significantly improve the angle of view characteristics of a conventional OCB type LCD.

A second object of the present invention is to provide a liquid crystal display device with high transmissivity.

A third object of the present invention is to provide a liquid crystal display device which can be driven by a low voltage.

Summary of the Invention

The present invention is a liquid crystal display device comprising a liquid crystal layer with bend orientation, the liquid crystal layer being compensated for optical phase difference with a film formed from discotic liquid crystal, whereby the liquid crystal display device has good angle of view characteristics which are not obtained from a conventional optically biaxial film.

More specifically, the liquid crystal display device according to the present invention comprises a liquid crystal layer enclosed between two transparent substrates and having bend orientation, a mechanism for modulating light transmitting through the liquid crystal layer for each pixel by applying voltage to each pixel of the liquid crystal layer, two filter mechanisms positioned at a position between the substrate and the liquid crystal layer and for selectively transmitting light passing through the liquid crystal layer, a voltage applying mechanism for applying a controlled voltage to each pixel of the liquid crystal layer, and two optical phase difference compensating mechanisms interposed in the substrate and the filter mechanism, each of which has an action for compensating modulation on light passing about one half thickness of the liquid crystal layer.

In the liquid crystal display device according to the present invention, the optical phase difference compensating mechanism comprises liquid crystal molecules with orientation which is point symmetrical with respect to the orientation of about one half of the liquid crystal layer to a contact point between the liquid crystal layer and the optical phase difference compensating mechanism as a reference. In addition, the product of index anisotropy $\Delta n$ of the liquid crystal layer of the liquid crystal display device and the thickness d is preferable to be $0.8 < \Delta n d < 2.0$.

PREFERRED EMBODIMENT

Figure 1:
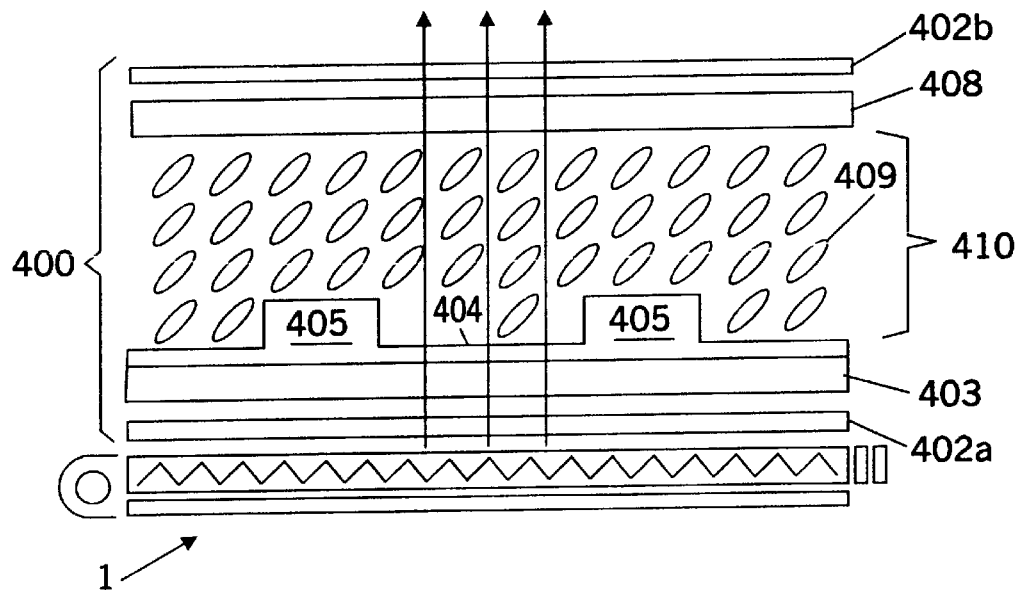
FIG. 1 is a schematic view of a typical liquid crystal display device.
Figure 2:
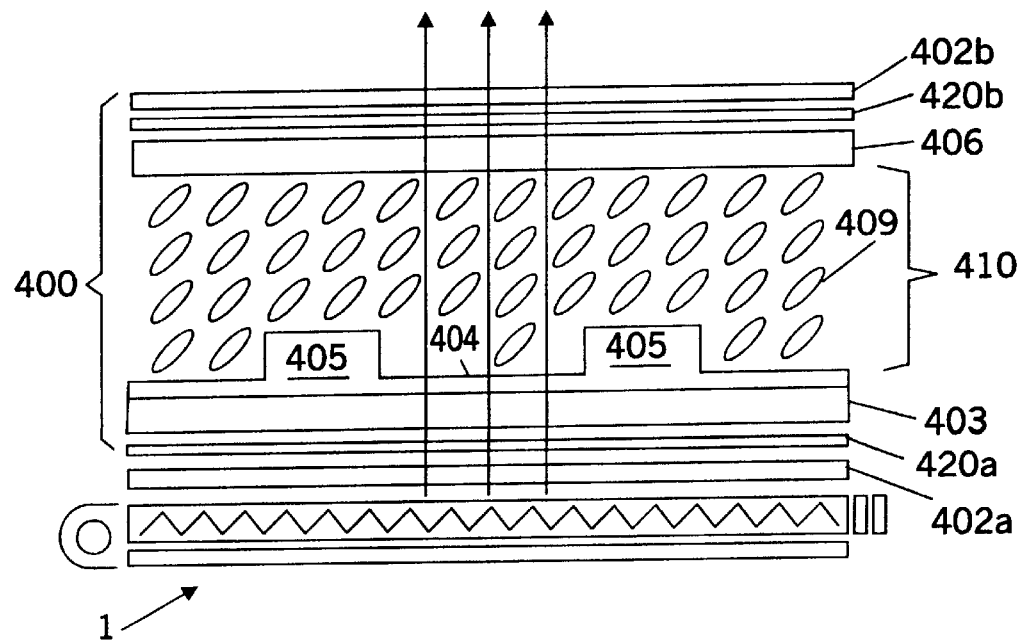
FIG. 2 is background art using optical compensation means for improving the angle of view characteristics.
Figure 3:
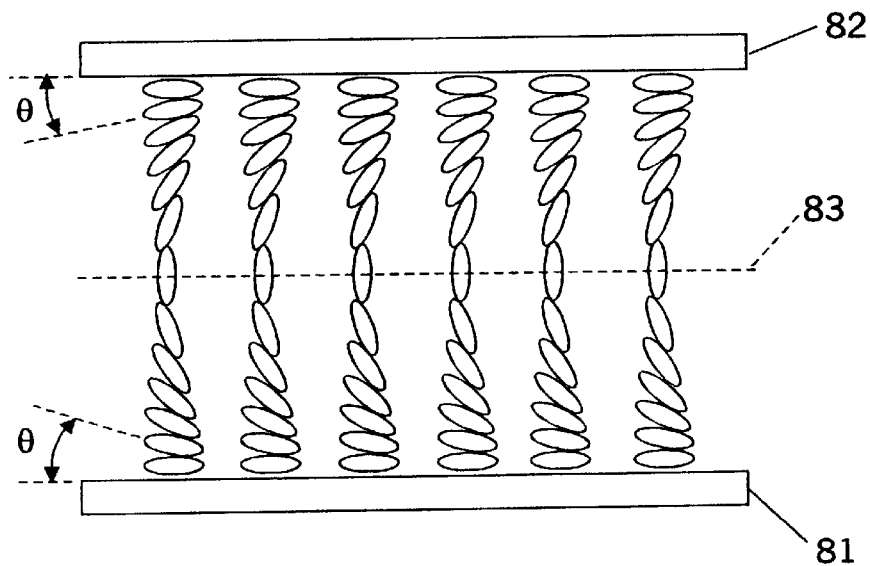
FIG. 3 is a view for illustrating an OCB mode.
Figure 4:
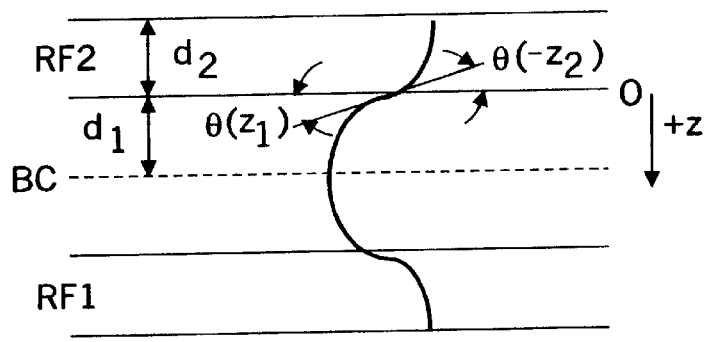
FIG. 4 is a diagram showing the principle of optical compensation according to the present invention.

FIG. 4 shows a liquid crystal layer with bend orientation (hereinafter called a "bend cell") and the principle for compensating optical activity provided by the bend cell. A region of BC is a region where the bend cell exists. A solid line represents orientation of the major axis of nematic liquid crystal turned into the bend cell state. Thus, since the bend cell has a positive uniaxial optical anisotropy, the optical activity can be completely compensated by positioning a layer with a region with completely opposite optical anisotropy. In FIG. 4, regions represented by RF1 and RF2 are the layer providing the compensation. Solid lines in the layers RF1 and RF2 represent the direction of orientation of liquid crystal molecules contained in these compensating layers. More particularly, the layer RF1 is a layer with optical characteristics for compensating the lower half of BC layer (the region lower than the dotted line). In addition, the layer RF2 is a layer with optical characteristics for compensating the upper half of BC layer (the region upper than the dotted line). Thus, it is the essential concept of the present invention to divide the layer BC into the upper and lower halves, and to compensate the optical phase difference with the compensating layers positioned lower and upper the layer BC.

This relationship is represented, as shown in FIG. 4, by using distances $z_1$ and $z_2$ from an interface between the layers BC and RF2 through the layer BC, and from the interface through the layer RF2 in assuming that the thickness of layers BC and RF2 is $2d_1$ and $d_2$, respectively, that +z coordinates are taken in the direction from the interface between the layer BC and the RF2 to the layer BC, that the direction of optical axis of liquid crystal molecule in the liquid crystal layer is $\theta_1(z)$ at a coordinate z, and that the direction of optical axis of liquid crystal molecule in the optical compensating layer is $\theta_2(z)$ ($\theta$ being positive in the counterclockwise direction). In this case, since the condition for attaining perfect compensation is $$\Delta n_1 d_1 = -\Delta n_2 d_2,$$

perfect optical compensation can be attained if $\theta_1$ and $\theta_2$ for coordinates $z_1$ and $-z_2$ are equal where $$z_2/d_2 = z_1/d_1.$$

Therefore, if $d_1 = d_2$,
then it is sufficient to arrange the direction of optical axis of liquid crystal molecule in the optical phase difference compensating layer so that:

$$\theta_2(z_2) = \theta_1(-z_1)$$

In addition, if $d_1 \neq d_2$, then it is sufficient to arrange the direction of optical axis of liquid crystal molecule in the liquid crystal layer so that $$\theta_2(z_2) = \theta_1(-(d_1/d_2)(z_2))$$

The reason why such perfect optical compensation can be attained, compensation can be attained only with optical compensation in the thickness direction (in the direction perpendicular to the substrate surface) because the bend cell does not substantially have twist in a plane parallel to the substrate surface. Then, the optical compensation in the thickness direction can be attained only with a optical phase difference compensating film positioned on each side of the liquid crystal layer.

Two films are used for RF1 and RF2 on each side of the liquid crystal layer BC. Usually, an optical phase difference compensating film with negative optically uniaxial or biaxial characteristics is used as the film. On the other hand, it is particularly suitable in attaining the object of the present invention to use an optical phase difference compensating film in which discotic liquid crystal, which is an optical medium with negative uniaxial index anisotropy, is oriented in a predetermined structure. When such optical phase difference compensating film is used, the orientation structures of discotic liquid crystal in RF1 and RF2 offset the optical action by the nematic liquid crystal in the upper and lower halves of BC, respectively, whereby BC, and RF1 and RF2 provide a wide angle of view, and become optically isotropic, so that significant improvement can be attained for the angle of view.

Figure 5:
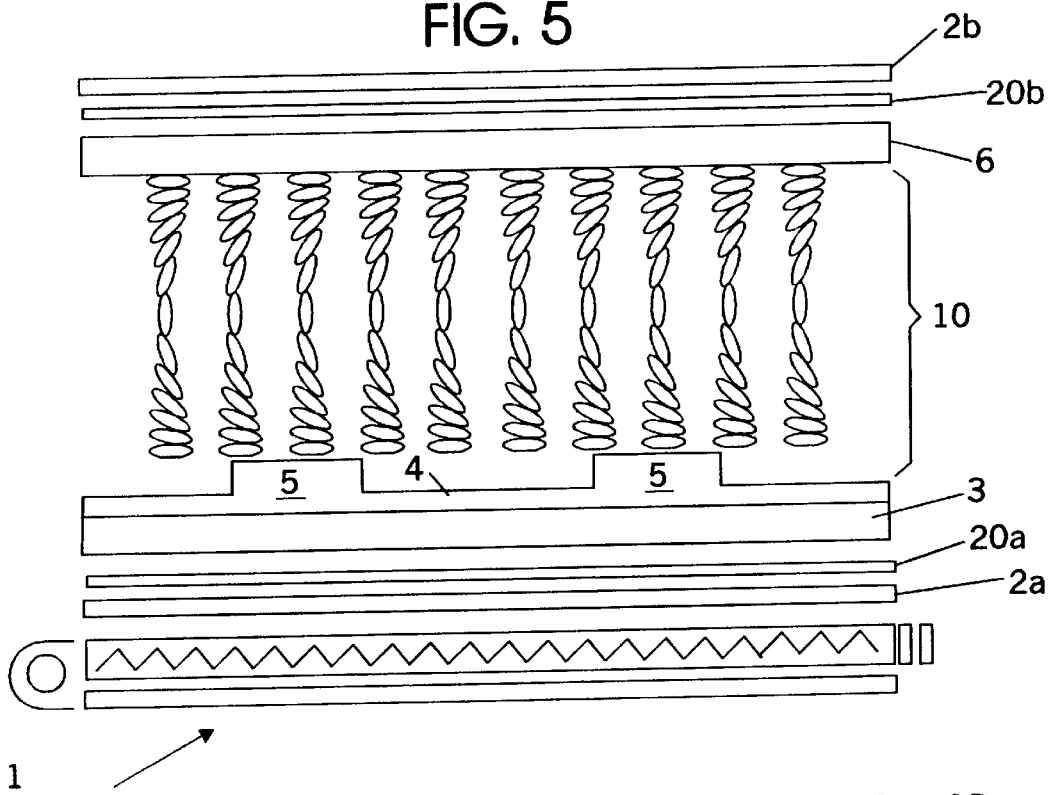
FIG. 5 is the arrangement of a liquid crystal display device of the present invention.

The present invention provides optical phase difference compensation for a nematic liquid crystal, which is an optical medium having positive birefringence, by using a film formed by negative uniaxial index anisotropic discotic liquid crystal which has the same or substantially same orientation structure as the orientation structure of the liquid crystal layer to be compensated. The embodiment according to the present invention is illustrated. As shown in FIG. 5, it is a liquid crystal display device in which such film is used as the optical phase difference compensating layers 20a and 20b, and the liquid crystal layer is of the OCB type. In the figure, there are shown a backlight 1, and an OCB type liquid crystal layer 10 held between glass substrates 3 and 6. The lower glass substrate 3 is formed with a TFT element 5 and a wiring layer 4 thereon to control the orientation of OCB type liquid crystal layer 10 for each pixel. In addition, polarizing filters 2a and 2b for shielding/transmitting specific polarization light located outside the glass substrates 3 and 6, and optical phase difference compensating films 20a and 20b are positioned between the glass substrate 3 and the filter means 2a and between the glass substrate 6 and the filter means 2b, respectively.

Figure 6A:
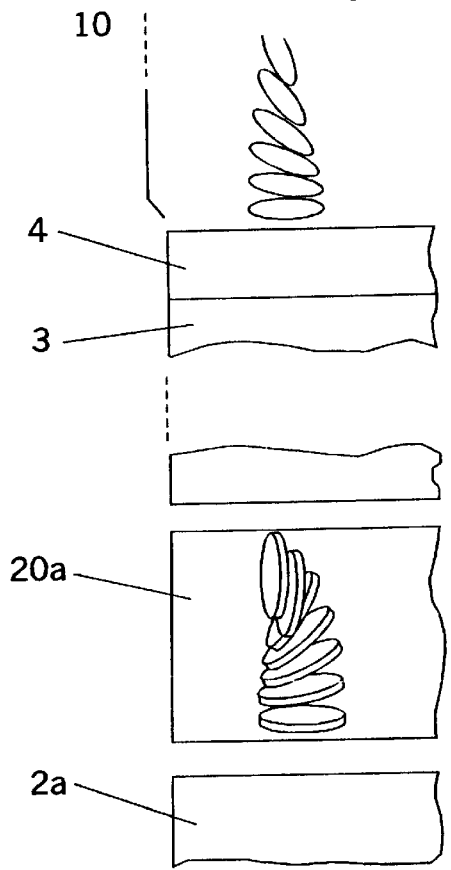
FIG. 6 is a schematic sectional view of an optical compensating film used in the present invention.

FIGS. 6(A) and (B) schematically show the optical phase difference compensating films 20a and 20b in which the discotic liquid crystal, which is an optical medium with negative uniaxial index anisotropy, is oriented to a predetermined structure. The orientation structure of such discotic liquid crystal is necessary to completely compensate the modulation of light by the orientation structure at the minimum or maximum driving voltage. Therefore, the angle θ between the discotic liquid crystal molecule in the optical phase difference compensating film and the film surface is desirable to gradually increase from substantially 0° at the surface region on the interface with the liquid crystal layer to substantially 90° at the region on the opposite surface.

Thus, since it is oriented at the interface with the nematic liquid crystal in the same direction as the orientation of nematic liquid crystal at the interface, and vertically oriented at other interfaces, it can compensate not only the phase difference by the nematic liquid crystal but also the optical activity, while the optical phase difference compensation by the conventional negative uniaxial film or biaxial film is only for the vertical and horizontal phase differences.

The subject of optical phase difference compensation is the orientation structure of the liquid crystal layer at the minimum or maximum driving voltage. It is necessary that the product Δnd of Δn of the discotic liquid crystal and its film thickness d is substantially equal to the product Δnd of Δn of the bend liquid crystal and its cell thickness d. The range of Δnd of the liquid crystal to be compensated for the optical phase difference is 0.8<Δnd<2.0. If it is lower than the lower limit, the transmissivity becomes insufficient to reduce convenience as the display device, while, if it exceeds the upper limit, the bend liquid crystal has too thick a cell thickness, so that roughness due to a spacer within the cell degrades display characteristics.

The manufacturing process for a film with the discotic liquid crystal includes a process placing and rubbing an orientation film on a transparent film, providing a discotic liquid crystal layer thereon, and curing the film while applying an electric or magnetic field to the film surface in a direction perpendicular to the film surface. PUPA No. 8-5837, "Optical Compensation Film, Manufacturing Process Thereof, and Liquid Crystal Display Device Using It," by Fuji Photo Film Co., Ltd. discloses a manufacturing process of a discotic liquid crystal film used for a twisted nematic liquid crystal display device.

Figure 7:
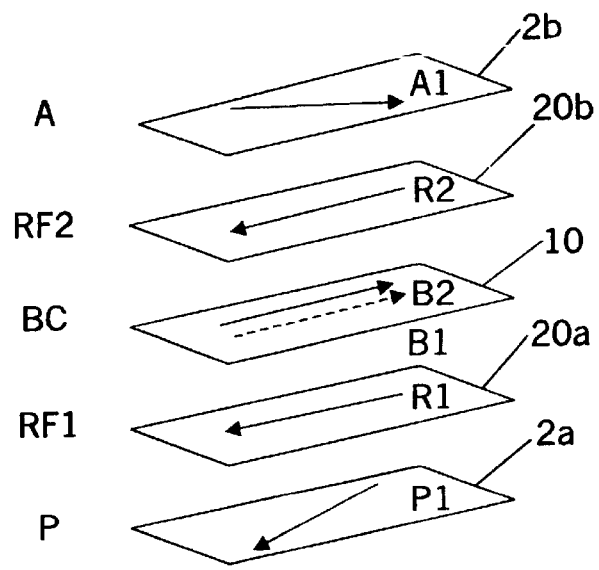
FIG. 7 is correlation of the transmission axis and rubbing direction of each layer in a liquid crystal display device according to the present invention.

In addition, FIG. 7 shows an example of relationship of a transmission axis and a rubbing direction on the polarizing filters 2a (A), 2b (P), the optical phase difference compensating films 20a (RF1), 20b (RF2), and the liquid crystal layer 10 (BC). In the figure, A1 and P1 represent the rubbing directions for the respective optical phase difference compensating films, and B1 and B2 represent the rubbing directions on the RF1 and RF2 sides of the OCB cell, respectively. In a preferred embodiment, the orientations A1 and P1 of transmission axes for two polarizing plates are orthogonal each other, and at 45° with the rubbing direction for the OCB cell.

EXAMPLES

For all examples and comparative examples listed in Table 1, the liquid crystal used was a fluorine type liquid crystal compound (physical properties: Δn=0.16, Δε=9.3, $k_{11}$=13.4 pN, $k_{22}$=7.4 pN, and $k_{33}$=14.7 pN).

Δnd represents retardation of a cell defined by the product of index anisotropy of the bend liquid crystal and its cell thickness, and the transmissivity and the angle of view are values at wavelength of 550 nm.

TABLE 1

|  | Δnd | Cell thickness (μm) | Optical compensation element | Transmissivity | Driving voltage (v) | Angle of view (vertical) (°) | Angle of view (horizontal) (°) |
|---|---|---|---|---|---|---|---|
| Example 1 | 1.92 | 12.0 | Discotic liquid crystal | 1.00 | 2.2–4.2 | +75/−65 | +65/−65 |
| Example 2 | 1.12 | 7.0 | Discotic liquid crystal | 0.95 | 2.2–7 | +80/−80 | +60/−60 |
| Example 3 | 0.80 | 5.0 | Discotic liquid crystal | 0.70 | 2.2–7 | +70/−80 | +60/−60 |

TABLE 1-continued

|  | Δnd | Cell thickness (μm) | Optical compensation element | Transmissivity | Driving voltage (v) | Angle of view (vertical) (°) | Angle of view (horizontal) (°) |
|---|---|---|---|---|---|---|---|
| Comparative Example 1 | 1.12 | 7.0 | Optically biaxial | 0.93 | 2.2–6.5 | +40/–35 | +55/–55 |
| Comparative Example 2 | 0.77 | 4.8 | Optically biaxial | 0.63 | 2.2–7 | +80/–40 | +60/–60 |
| Comparative Example 3 | 0.64 | 4.0 | Discotic liquid crystal | 0.49 | 2.2–7 | +70/–80 | +55/–55 |

Figure 6B:
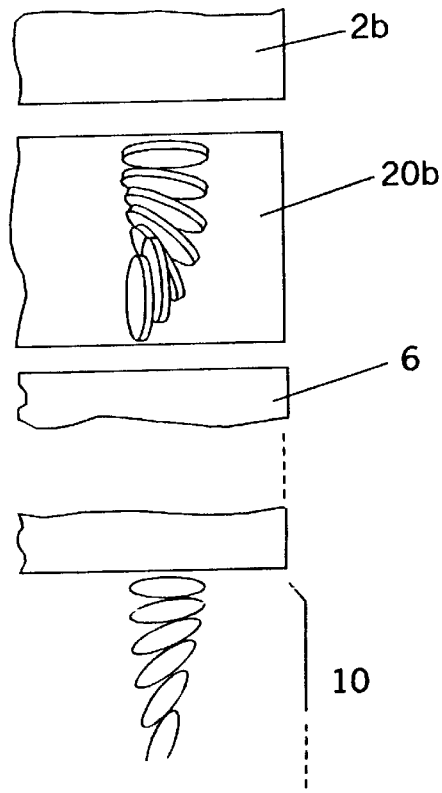
Figure 8C:
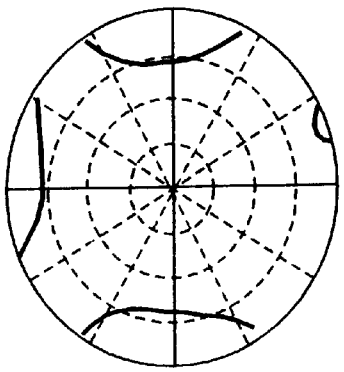
FIG. 8 is radar charts showing 10:1 iso-contrast curves at wavelength 550 nm calculated for angle of view characteristics of examples of the present invention and background art.
Figure 8F:
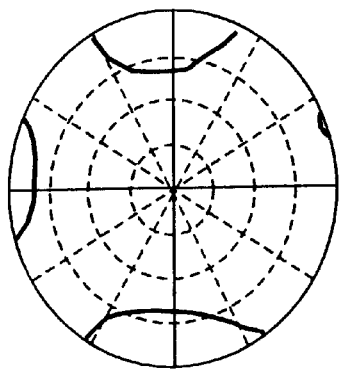
Figure 8B:
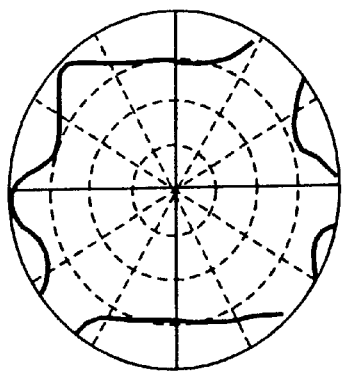
Figure 8E:
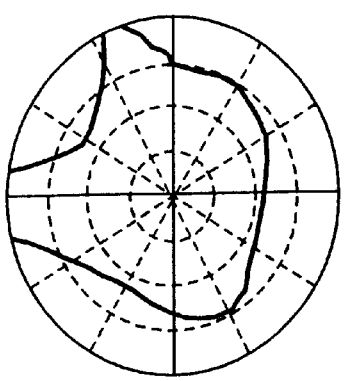
Figure 8A:
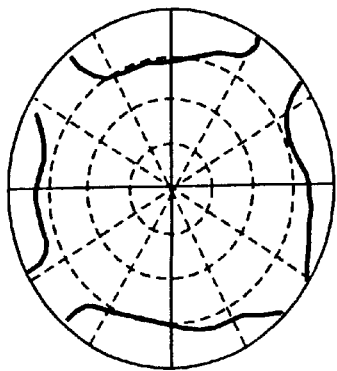
Figure 8D:
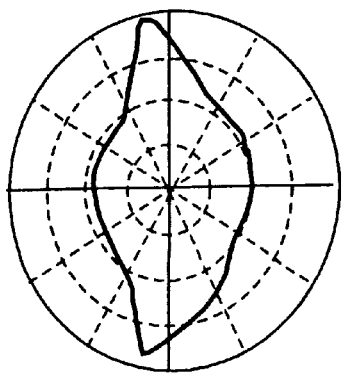

The discotic liquid crystal film of Examples 1 through 3 and Comparative Example 3 has negative Δn equal to that of the bend liquid crystal, thickness of about one half the bend cell, and exactly same orientation as the upper and lower halves of the bend orientation of the liquid crystal at the minimum driving voltage 2.2 V. Each one of it is placed on the upper and lower surfaces of the bend liquid crystal cell as shown in FIGS. 4 and 6. The film thickness was 5.7 μm, 3.3 μm, 2.4 μm, and 1.9 μm for Examples 1 through 3, and Comparative Example 3, respectively.

FIG. 8 are radar charts showing 10:1 iso-contrast curves at a wavelength 550 nm of the angle of view characteristics calculated for Examples of the present invention and an example of conventional optically biaxial phase difference film for comparison. As clearly seen from FIG. 8, an OCB type liquid crystal display device compensated for optical phase difference with the discotic liquid crystal (Examples 1–3) had very good angle of view characteristics. In addition, even in a case where the discotic liquid crystal was used as the optical phase difference compensating means, sufficient transmissivity could not be obtained for about Δnd<0.7, so that a preferred example could not be obtained. When Δnd is noticed, it is possible to obtain a liquid crystal display device in which all of the transmissivity, the angle of view, and the driving voltage are excellent particularly in a range of about Δnd>1.5. However, since the cell thickness increases as Δnd increases, there arises difficulty in manufacturing. In addition, generally, optical compensation becomes difficult when Δnd increases to increase sensitivity for dimensions, leading to unstable characteristics.

Each of Examples and Comparative Examples is described in the following.

While Example 1 has high optical activity of the liquid crystal layer with a cell thickness of 12 μm and high Δnd of 1.92, the angle of view is very wide because perfect optical compensation is provided. Because of high Δnd, the transmissivity can be maintained at 100%, and the maximum driving voltage can be lowered to 4.2 V. Example 2 also has a very wide angle of view as in Example 1 because of the cell thickness of 7 μm and Δnd of the liquid crystal cell of 1.12. 95% of transmissivity can be obtained at the maximum driving voltage of 7 V. Example 3 also has a very wide angle of view as in Example 1 because of the cell thickness of 5.0 μm and Δnd of the liquid crystal cell of 0.80. Since Δnd is low, transmissivity of 70% at the lowest allowable limit can be obtained at the maximum driving voltage of 7 V.

Comparative Example 1 is an example using a biaxial film, in which Δnd is made 1.12 to provide little transmissivity loss. Because of high Δnd, the optical activity cannot be ignored for the bend liquid crystal layer so that the vertical angle of view is narrow. The biaxial film is arranged to have Δnd=100 nm and Nz=9.0 so that black display can be obtained at a liquid crystal voltage of 6.5 V (here, Δnd and Nz are defined as $(n_y-n_x)$ d and $(n_y-n_z)/(n_y-n_x)$, respectively, where $n_x$ and $n_y$ are refractive indices along the film plane, $n_x$ is in the same direction as the rubbing direction for the bend liquid crystal, $n_z$ is refractive index in the film depth, and d is the thickness of film). Comparative Example 2 also uses a biaxial film, and is intended to reduce the optical activity of the bend liquid crystal layer and to increase the vertical angle of view by reducing the thickness of bend liquid crystal cell and making Δnd 0.77. However, low Δnd causes loss in the transmissivity. The biaxial film of liquid crystal has Δnd=65 nm and $N_z$=9.0 so that black display can be obtained at the liquid crystal voltage of 7 V. Comparative Example 3 is to compensate a liquid crystal cell with cell thickness of 4.0 μm and Δnd of 0.80 with a discotic liquid crystal film. It is an example where it has a very wide angle of view as in Example 1, while it has too low transmissivity due to low Δnd.

Advantages of the Invention

As clearly seen from Table 1 and FIG. 8, the angle of view characteristics are significantly improved. Particularly, the angle of view characteristics are significantly improved for the vertical and oblique directions where the angle of view is deteriorated in the optical phase difference compensation by a conventional biaxial film because of optical activity of the nematic liquid crystal. In addition, since this approach completely compensates the optical action due to optical activity ad phase difference of liquid crystal layer, the optical phase difference can be compensated for any Δnd (retardation) of the liquid crystal layer, so that high transmissivity can be obtained by selecting high Δnd, and the maximum driving voltage can be lowered.

I claim:

1. A liquid crystal display device comprising:
    a multi-pixel active matrix liquid crystal display with a liquid crystal layer which is enclosed between two transparent substrates, has a thickness $2d_1$ and has a bend orientation where the angle $\Theta_1$ of the optical axis of the liquid crystal molecules of the layer varies as a function of the distance $z_1$ from the transparent substrates;
    a thin film semiconductor element and a wiring layer for each pixel for modulating light transmitted through said liquid crystal layer by applying voltage to each pixel of said liquid crystal display;
    filter films for selectively transmitting light passing through said liquid crystal layer; and
    two liquid crystal optical phase difference compensating layers with a thickness $d_2$ interposed between said two substrates and said filter films where the angle $\Theta_2$ of the optical axis of the liquid crystal molecules in each phase difference compensating layer varies as a function of the distance $z_2$ from an adjacent one of the two transparent substrates with $z_2/d_2$ set substantially equal to $z_1/d_1$ to make $\Theta_2$ substantially equal with $\Theta_1$ so that each compensating layer performs symmetrical compensating modulation on light passing through about one half the thickness of said liquid crystal layer.

2. The liquid crystal display device as set forth in claim 1, wherein $d_1=d_2$, and $\Theta_2(z_2)=\Theta_1(-z_1)$.

3. The liquid crystal display device as set forth in claim 1, wherein $0.8<\Delta nd<2.0$.

4. A method for attaining a wide angle of view on a liquid crystal display device having a liquid crystal layer, with a bend orientation, enclosed between two transparent substrates and two filter mechanisms positioned between said substrate and said liquid crystal layer for selectively transmitting light passing through said liquid crystal layer, said method characterized by:

using two liquid crystal optical phase difference compensating layers interposed between said two substrates and said filter mechanisms, each of which is for performing symmetrical compensating modulation on light passing through about one half the thickness of said liquid crystal layer, having the negative of the product of the anisotrophy $\Delta n_2$ of the optical phase difference compensating layers and thickness $2d_2$ of those compensating layers substantially equal to the product of the anisotrophy $\Delta n_1$ of the liquid crystal layer and the thickness $2d_1$ of the liquid crystal layer; and having the product $\Delta n_1 \ 2d_1$ of the anisotrophy of the liquid crystal layer and the thickness of the liquid crystal layer be a value between 0.8 and 2.0.

5. The method of claim 4 including using a negative uniaxial index anisotropic liquid crystal in the compensating layers with the same or substantially the same orientation structure as the liquid crystal layer.

6. A liquid crystal display device comprising:

a multi-pixel active matrix liquid crystal display with a liquid crystal layer which is enclosed between two transparent substrates and has a bend orientation where the range of the product of the anisotrophy $\Delta n_1$ of the liquid crystal layer and the thickness $2d_1$ of the layer is $0.8<\Delta n_1 \ 2d_1<2.0$;

means for each pixel for modulating light transmitted through said liquid crystal layer by applying voltage to each pixel of said liquid crystal display;

filter means for selectively transmitting light passing through said liquid crystal layer; and two optical phase difference compensating means interposed between said two substrates and said filter means, each compensating means for performing symmetrical compensating modulation on light passing through about one half the thickness of said liquid crystal layer.

7. The liquid crystal display device as set forth in claim 6, wherein said optical phase difference compensating means includes liquid crystal wherein the product of anisotrophy of the liquid crystal $\Delta n_2$ and the thickness $d_2$ of each optical phase difference compensating means $\Delta n_2 \ d_2$ substantially equals $\Delta n_1 \ d_1$.

8. A liquid crystal display device comprising:

a multi-pixel active matrix liquid crystal display with a liquid crystal layer which is enclosed between two transparent substrates, has a thickness $2d_1$ and has a bend orientation where the angle $\Theta_1$ of the optical axis of the liquid crystal molecules of the layer varies as a function of the distance $z_1$ from the transparent substrate;

a thin film semiconductor element for each pixel for modulating light transmitted through said liquid crystal layer by applying voltage to each pixel of said liquid crystal display;

two polarizing filters for selectively transmitting light passing through said liquid crystal layer; and two liquid crystal optical phase difference compensating layers each with a thickness $d_2$ formed of negative uniaxial index anisotropic liquid crystal which has the same or substantially the same orientation structure as that of the liquid crystal layer which compensating layers are each interposed between one of said two substrates and one of said two polarizing filters where the angle $\Theta_2$ of the optical axis of the liquid crystal molecules in each of the phase difference compensating layers varies as a function of the distance $z_2$ from the glass substrate with $z_2/d_2$ set substantially equal to $z_1d_1$ to make $\Theta_2$ substantially equal to $\Theta_1$ so that each compensating layer performs symmetrical compensation modulation on light passing through about one half the thickness of said liquid crystal layer.

9. The liquid crystal display device as set forth in claim 8, wherein the angle $\Theta_2$ of the liquid crystal molecules in said optical phase difference compensating films gradually increases from being substantially parallel to the transparent substrate adjacent a polarizing filter substantially perpendicular to the transparent substrate adjacent a transparent substrate.

10. The liquid crystal display device as set forth in claim 9, wherein $d_1=d_2$, and $\Theta_2(z_2)=\Theta(-z_1)$.

11. The liquid crystal display device as set forth in claim 10, wherein $0.8<\Delta n_1 2 \ d_1<2.0$.

12. A liquid crystal display device comprising:

a multi-pixel active matrix liquid crystal display with a liquid crystal layer which is enclosed between two transparent substrates, has a thickness $2d_1$ and has a bend orientation where the angle $\Theta_1$ of the optical axis of the liquid crystal molecules of the layer varies as a function of the distance $z_1$ from the transparent substrates; a thin film semiconductor element for each pixel for modulating light transmitted through said liquid crystal layer by applying voltage to each pixel of said liquid crystal display;

filter films for selectively transmitting light passing through said liquid crystal layer; and two liquid crystal optical phase difference compensating layers with a thickness $d_2$ interposed between said two substrates and said filter films where then angle $\Theta_2$ of the optical axis of the liquid crystal molecules in each phase difference compensating layer varies as a function of the distance $z_2$ from an adjacent glass substrate with $z_2/d_2$ set substantially equal to $z_1/d_1$ to make $\Theta_2(z_2)=\Theta_1(-(d_1/d_2)(z_2))$ so that each compensating layer performs compensating modulation on light passing through about one half the thickness of said liquid crystal layer.

13. The liquid crystal display device as set forth in claim 12, wherein $d_1=d_2$, and $\Theta_2(z_2)=\Theta_1(-z_1)$.

* * * * *